United States Patent [19]

Schultz et al.

[11] Patent Number: 5,769,465
[45] Date of Patent: Jun. 23, 1998

[54] SYSTEM FOR CONNECTING A HOUSING TO A TUBE

[75] Inventors: Jeffrey A. Schultz, Pittsville; Bobby Shelton, Gretna, both of Va.

[73] Assignee: Bridge Products, Inc., Northbrook, Ill.

[21] Appl. No.: 685,333

[22] Filed: Jul. 23, 1996

[51] Int. Cl.$^6$ .................................................... F16L 25/00
[52] U.S. Cl. .............................. 285/328; 285/382; 29/511
[58] Field of Search .................................. 265/382, 328; 29/511

[56] References Cited

U.S. PATENT DOCUMENTS

| | | | |
|---|---|---|---|
| 1,936,669 | 11/1933 | Heeter | 285/382 X |
| 2,704,678 | 3/1955 | Klein et al. | 285/382 X |
| 4,042,262 | 8/1977 | Mooney et al. | 285/382 X |
| 4,103,941 | 8/1978 | Stoll | 285/382 X |
| 4,357,990 | 11/1982 | Melnyk . | |
| 4,575,134 | 3/1986 | Sugano . | |
| 4,707,999 | 11/1987 | Ohta et al. . | |
| 4,832,380 | 5/1989 | Oetiker . | |
| 4,902,049 | 2/1990 | Umehara et al. | 285/382 X |
| 4,932,114 | 6/1990 | Morse et al. | 285/382 X |
| 5,007,667 | 4/1991 | Unewisse et al. . | |
| 5,046,765 | 9/1991 | Usui . | |

FOREIGN PATENT DOCUMENTS

| | | | |
|---|---|---|---|
| 1801294 | 5/1970 | Germany | 285/382 |
| 5141580 | 6/1993 | Japan | 285/382 |
| 6174171 | 6/1994 | Japan | 285/382 |

*Primary Examiner*—Dave W. Arola
*Attorney, Agent, or Firm*—Brinks Hofer Gilson & Lione

[57] ABSTRACT

A housing having a socket surrounded by an annular flange is connected to a tube having a raised annular shoulder. The tube is inserted in the socket, and then the flange is deformed radially inwardly to capture the shoulder in the housing. The flange is also recurved alongside the sidewall of the tube on a side of the shoulder opposite the housing to support the tube against bending. The flange includes an inwardly directed wall having an array of raised features positioned to enhance frictional engagement between the wall and the tube when the raised features are forced against the tube as the flange is deformed. In this way rotation of the tube in the housing is inhibited.

8 Claims, 1 Drawing Sheet

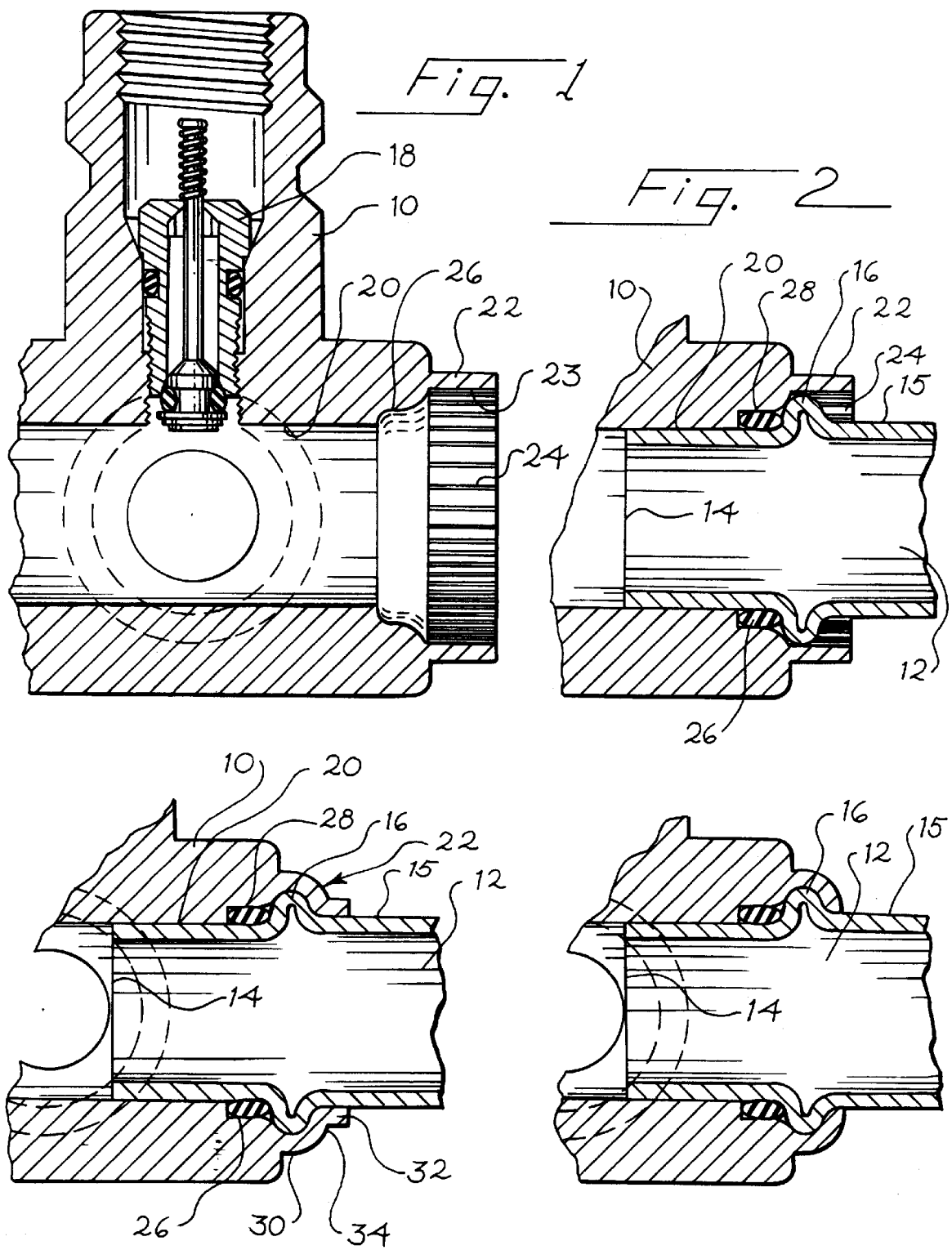

5,769,465

SYSTEM FOR CONNECTING A HOUSING TO A TUBE

BACKGROUND OF THE INVENTION

This invention relates to a system for providing a high reliability, high strength connection between a tube and a housing.

Systems such as automotive air conditioning systems include tubes which are secured to various types of housings, including valve housings, receiver housings and the like. Ohta U.S. Pat. No. 4,707,999 discloses one system for connecting such tubes and housings. As shown for example in FIG. 4 of the attached drawings, the tube 12 to be connected includes an end 14 and an outer sidewall 15. A raised annular shoulder 16 is formed on the tube 12 near the end 14. The housing is provided with an annular flange which is deformed over the shoulder 16 to secure the tube 12 to the housing.

This prior art system suffers from two disadvantages. First, bending forces can result in high stresses in the tube at the region adjacent the end of the deformed flange. Second, the frictional engagement between the tube and the flange may not be sufficient to prevent rotation of the tube with respect to the housing in all cases. Such rotation is a drawback in some applications.

SUMMARY OF THE INVENTION

The present invention is directed to an improved system for connecting a housing to a tube, which provides increased bending strength in the region of the connection, and which also reduces rotation of the tube with respect to the housing.

The apparatus of this invention comprises a tube and a housing. The tube comprises a sidewall and a raised shoulder projecting outwardly from the sidewall. The housing comprises a socket sized to receive the tube and a flange positioned around the shoulder.

According to a first aspect of the apparatus of this invention, the flange comprises first and second portions, and the first portion is positioned between the housing and the second portion. The flange is deformed over the shoulder and the tube such that the first portion of the flange extends radially inwardly over the shoulder, and the second portion of the flange extends generally parallel to the sidewall. By extending the flange parallel to the sidewall, increased bending resistance is provided to the tube at the junction between the tube and the housing.

According to a second aspect of the apparatus of this invention, the flange comprises a radially inwardly directed wall which comprises an array of raised features positioned to enhance frictional engagement between the wall and the tube when the wall is deformed over the shoulder to inhibit rotation of the tube in the socket.

Though these first and second aspects of the invention are preferably used together as described below, they can be used separately from one another. That is, the flange may be dimensioned to extend generally parallel to the sidewall, but can omit the raised anti-rotation features, or vice versa.

According to the method of this invention, a tube of the type described above and a housing are provided. The housing comprises a socket sized to receive the tube and a flange positioned radially outwardly of the socket. The tube is inserted in the socket such that the flange is positioned radially outwardly of the shoulder, and then the flange is deformed radially inwardly to capture the shoulder in the housing.

According to a first aspect of the method of this invention, the flange is recurved along the sidewall to support the tube on a side of the shoulder opposite the housing. In this way increased bending resistance is provided.

According to a second aspect of the method of this invention, the flange of the housing is provided with a radially inwardly directed wall which comprises an array of raised features, and the forming step comprises the step of forcing at least some of the raised features against the tube to enhance frictional engagement between the wall and the tube.

Both aspects of the method of this invention are preferably used in combination, but they can be used separately from one another if desired.

BRIEF DESCRIPTION OF THE DRAWINGS

FIG. 1 is a fragmentary cross-sectional view of a housing which incorporates a preferred embodiment of this invention, prior to insertion of a tube in the housing.

FIG. 2 shows a portion of the housing of FIG. 1 after an O-ring and a tube have been inserted into the housing.

FIG. 3 is a cross-sectional view corresponding to FIG. 2 showing the housing after the flange has been deformed over the shoulder of the tube to secure the in the housing.

FIG. 4 is a fragmentary view of a prior art system for connecting a housing to a tube.

DETAILED DESCRIPTION OF THE PRESENTLY PREFERRED EMBODIMENTS

Turning now to the drawings, FIG. 1 shows a cross-sectional view of portions of a housing 10 which incorporates a presently preferred embodiment of this invention. In this example, the housing 10 is a valve housing intended for use in an automotive air conditioning system. The housing 10 supports a valve 18 which can be a conventional refrigerant filling valve. The housing 10 defines a passage 20 extending therethrough, and this passage 20 forms a socket for receiving the end of a tube, as described below. The passage 20 is surrounded by an annular flange 22 which defines a radially inwardly facing wall 23. This wall 23 defines an array of raised features 24 such as ridges. In other embodiments, the raised features can be of any suitable shape or pattern, including knurling, raised dots, and ridges. These raised features can be oriented in any desired configuration. The passage 20 also defines a recess 26 immediately inwardly of the flange 22.

As shown in FIG. 2, the first step in connecting a tube to the housing 10 is to insert the tube in the passage 20. In FIG. 2 the tube is indicated by the reference numeral 12, and the tube 12 defines an end 14 and a sidewall 15. The sidewall 15 is dimensioned to fit smoothly within the passage 20. The tube 12 defines an annular raised shoulder 16 which is dimensioned to fit radially within the flange 22. Preferably, an O-ring 28 is positioned on the end of the tube 12 as shown, such that the O-ring 28 is disposed in the recess 26 when the tube 12 is assembled with the housing 10 as shown in FIG. 2.

The next step in securing the tube 12 to the housing 10 is to deform the flange 22 as shown in FIG. 3, as for example with a rolling operation. The flange 22 includes a first portion 30 which is bent radially inwardly over the shoulder 16 to capture the shoulder 16 and therefore the tube 12 in the housing 10. The flange 22 also includes a second portion 32 which is recurved to extend closely adjacent to and alongside the sidewall 15. An annular, outwardly concave region 34 is disposed between the first and second portions 30, 32. The step of deforming the flange 22 radially inwardly to capture the shoulder 15 and the step of recurving the flange 22 along side the sidewall to support the tube 12 are preferably done substantially simultaneously, though they can be performed in any appropriate order. In this embodiment, the flange 22 and the first and second portions 30, 32 are continuous and annular in shape, and they extend completely around the tube 12. Alternately, the flange 22 and the first and second portions 30, 32 may be formed as one or more segments, each having a curcumferential arc of less than 360°.

The finished connection as shown in FIG. 3 provides several important advantages. First, because the second portion 32 extends alongside the tube 12, the tube 12 is supported against bending adjacent the shoulder 16. In this way, bending resistance is increased. Second, the ridges 24 are forced into the shoulder 16 and the sidewall 15 during the deforming and recurving operations, thereby substantially preventing the tube 12 from rotating in the housing 10. These advantages are obtained at a small increase in cost of the housing 10 or the deforming and recurving operations.

In order to define the presently preferred embodiment of this invention, the following details of construction are provided. It should be clearly understood that these details are intended only by way of illustration, and that they are not intended to limit in any way the scope of the following claims. By way of example, the housing 10 and the tube can be formed of metal such as respective aluminum alloys. The passage 20 can have a diameter such as 0.50 inch, and the flange 22 can have a height such as 0.090 inch. The ridges 24 can be approximately 0.015 inch in radial height, and 100 ridges can be provided around the circumference of the flange 22. The housing 10 can have a hardness of 60, and the tube 12 can have a hardness of 50, both measured on the Rockwell B scale. Conventional roll forming tools can be used to deform the flange 22 over the shoulder 16 as described above and to partially embed the ridges in the tube.

Of course, it should be understood that many changes and modifications can be made to the preferred embodiment described above. For example, the recurved flange can be used without the internal ridges, or internal ridges or other protruding features can be provided on the inside of the flange without recurving the flange. The shape, spacing and pattern of the protruding elements on the inter wall of the flange can be varied as desired, as can materials, proportions and sizes. It is therefore intended that the foregoing detailed description be regarded as an illustration of one form of the invention, and not as a definition of the invention. It is only the following claims, including all equivalents, which are intended to define the scope of this invention.

We claim:

1. A system for connecting a housing to a tube, said system comprising:

a tube comprising a sidewall and a raised annular shoulder projecting outwardly from the sidewall;

a housing comprising a socket sized to receive the tube and to limit movement of the tube into the housing, said tube received in said socket and said housing further comprising a flange positioned radially outwardly of the tube;

said flange comprising first and second portions, said first portion positioned between the housing and the second portion;

said flange deformed over the shoulder and the tube such that the first portion of the flange extends radially inwardly over the shoulder, and the second portion of the flange extends generally parallel to the sidewall;

said flange comprising a radially inwardly directed wall, said wall comprising an array of raised features positioned to enhance frictional engagement between the wall and the tube to inhibit rotation of the tube with respect to the wall;

said raised features disposed in part in the first portion of the flange and in part in the second portion of the flange such that the raised features engage both the shoulder and the sidewall of the tube.

2. The invention of claim 1 wherein the second portion of the flange defines an inner diameter, wherein said shoulder defines an outer diameter, and wherein the inner diameter of the second portion of the flange is less than the outer diameter of the shoulder.

3. The invention of claim 1 wherein the flange recurves between the first and second portions of the flange to form an outwardly concave region adjacent the shoulder.

4. The invention of claim 1 wherein the array of raised features comprises an array of raised ridges.

5. The invention of claim 1 wherein the housing comprises a harder material than the tube.

6. The invention of claim 1 wherein the flange comprises a metal.

7. A method for connecting a housing to a tube, said method comprising the following steps:

(a) providing a tube comprising a sidewall and a raised annular shoulder projecting outwardly from the sidewall;

(b) providing a housing comprising a socket sized to receive the tube and to limit movement of the tube into the housing, said housing further comprising a flange positioned radially outwardly of the socket, said flange comprising an array of raised features;

(c) inserting the tube in the socket such that the flange is positioned radially outwardly of the shoulder;

(d) deforming the flange radially inwardly against the shoulder and the sidewall to capture the shoulder in the housing and to force at least some of the raised features against the tube both at the sidewall and at the raised annular shoulder to enhance frictional engagement between the wall and the tube;

said deforming step comprising the step of recurving the flange alongside the sidewall to support the tube on a side of the shoulder opposite the housing.

8. The method of claim 7 wherein step (d) comprises the step of roll forming the flange radially inwardly.

* * * * *